June 7, 1955   C. T. HOLZMUELLER, SR   2,710,038
ANTI-SKID DEVICE
Filed Jan. 23, 1953
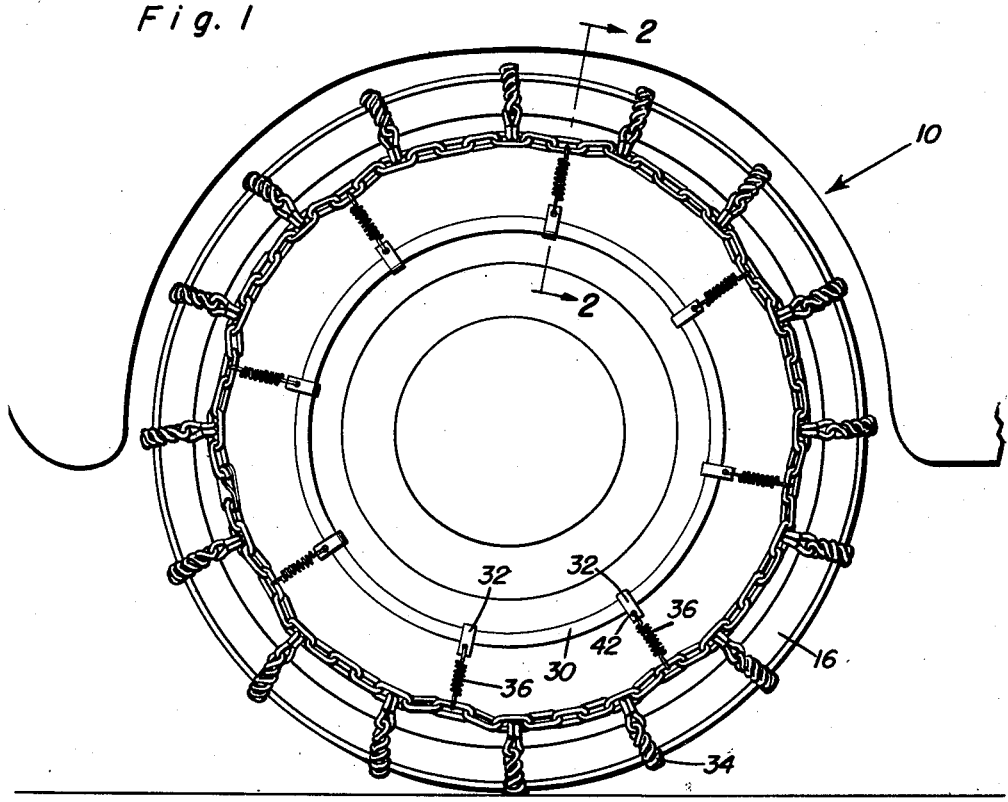
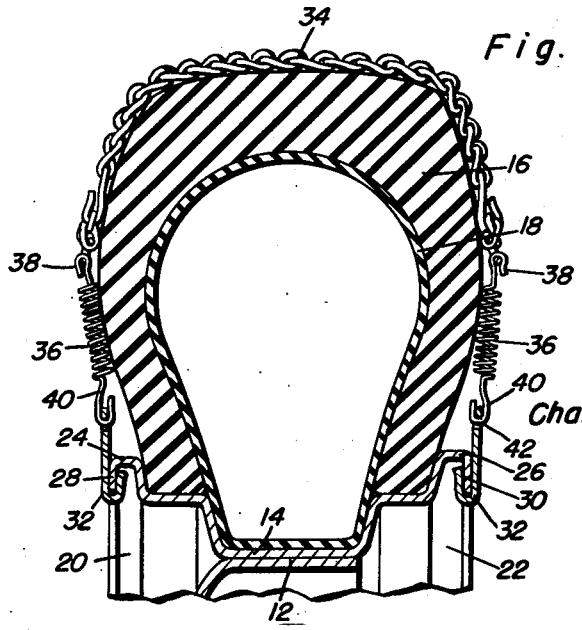
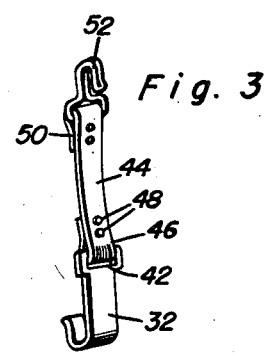
Charles T. Holzmueller, Sr.
INVENTOR.

2,710,038

ANTI-SKID DEVICE

Charles T. Holzmueller, Sr., Drexel Hill, Pa.

Application January 23, 1953, Serial No. 332,795

1 Claim. (Cl. 152—218)

This invention relates to automotive vehicles and more particularly to a wheel construction for attaching tire chains to increase the traction of pneumatic tires.

The particular object of this invention is to provide means for easily attaching a tire chain to a wheel.

A further object of this invention resides in the provision of resilient means for attaching chains about tires to a wheel rim, which resilient means are adapted to provide a certain amount of yield were a stone or other uneven surface travelled over by the tire so as to reduce the possibility of snapping or breaking one of the links of the tire chain.

The construction of this invention features a wheel provided with a radially inwardly extending flange on which hooks are adapted to be secured to carry the resilient means used in attaching the chain to the wheel.

Still further objects and features of the invention reside in the provision of a wheel construction of the nature described that is strong and durable, capable of being readily substituted for existing wheels which are unobtrusive in their appearance, and which may be easily manufactured at a relatively low cost.

These, together with the various ancillary objects and features of the invention which will become apparent as the following description proceeds, are attained by this wheel construction, preferred embodiments of which have been illustrated in the accompanying drawings, by way of example only, wherein:

Figure 1 is a side elevational view showing a tire chain operatively installed on the wheel comprising the present invention;

Figure 2 is an enlarged sectional view as taken along the plane of line 2—2 in Figure 1; and Figure 3 is a perspective view of an additional form of resilient means for attaching the chain to the wheel.

With continuing reference to the accompanying drawings wherein like reference numerals designate similar parts throughout the various views, reference numeral 10 generally designates the wheel construction comprising the present invention which includes a wheel having a hub 12 with a rim 14 attached thereto. A pneumatic tire 16 with an inflatable tube 18 is secured on the rim 14. Integrally formed with the rim 14 are flanges 20 and 22 having portions 24 and 26 extending outwardly and away from the wheel and portions 28 and 30 extending a considerable distance inwardly toward the axis of rotation of the wheel 10. It is to be noted that the flanges 20 and 22 extend about the entire periphery of the wheel rim 14 thus enabling the device to be easily utilized no matter what the position of the wheel is relative to the ground.

Engaged about the flange portions 28 and 30 are a plurality of angularly spaced hooks 32. A tire chain indicated at 34 is held in position about the tire 16 by coil springs 36 having hook portions 38 and 40 engaging the chain and extending through the apertures 42 in the hooks 32, respectively. The springs 36 provide a resilient means for holding the hooks 32 in engagement with the flange portions 28 and also provide means for preventing unnecessary damage to the chain 34 if a stone or other obstacle is encountered during the travel of the vehicle over the pavement.

Referring now to Figure 3 it will be seen that herein there is provided an elastic band 44 which has a looped portion 46 formed at one end and held in place by rivets 48. Section 50 carries a hook 52 for engagement with the chains 34. The elastic band 44 may be readily substituted in lieu of the springs 36. Hence from the foregoing the construction and advantages of this construction are readily apparent, further description is believed to be unnecessary.

It is to be understood that the wheel rim comprising the present invention is particularly adapted to be used in combination with emergency type chains which simply include straps attached to each side of a portion of chain. Hooks are secured to the straps which are then engaged about the flanges 28 and 30. Furthermore, other types of tire chain may be used in combination with this wheel rim.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In combination, a rim, a pneumatic tire on said rim, a tire chain about said tire, said tire chain having circular side portions interconnected by transverse chain portions overlying the tread of said pneumatic tire, said rim having a peripheral flange substantially L-shaped in cross section on each side thereof, said flanges each having a portion extending axially outwardly of said rim, said flanges each having a further portion thereof extending radially inwardly toward the axis of rotation of said rim, and means for securing said circular side portions of said chain to said radially extending portions of said rim, said securing means each comprising a pair of hooks and an elastic band with a hook secured to each end of the band, one of said hooks engaging a circular side portion intermediate a pair of transverse chain members and the other hook engaging a radially extending rim portion.

References Cited in the file of this patent

UNITED STATES PATENTS

| 1,523,135 | Martin | Jan. 13, 1925 |
| 2,020,586 | Stetson | Nov. 12, 1935 |
| 2,308,904 | Wood | Jan. 19, 1943 |
| 2,433,605 | Faulds | Dec. 30, 1947 |
| 2,570,685 | John | Oct. 9, 1951 |

FOREIGN PATENTS

| 2,181 | Great Britain | 1903 |